(12) United States Patent
Stawiarski et al.

(10) Patent No.: US 11,224,013 B2
(45) Date of Patent: Jan. 11, 2022

(54) FACILITATION OF IDLE MODE CELL RESELECTION FOR 5G OR OTHER NEXT GENERATION NETWORK

(71) Applicants: AT&T Intellectual Property I, L.P., Atlanta, GA (US); AT&T Technical Services Company, Inc., Vienna, VA (US)

(72) Inventors: Slawomir Stawiarski, Carpentersville, IL (US); Daniel Vivanco, Ashburn, VA (US); Mark Stockert, San Antonio, TX (US)

(73) Assignees: AT&T INTELLECTUAL PROPERTY I, L.P., Atlanta, GA (US); AT&T TECHNICAL SERVICES COMPANY, INC., Vienna, VA (US)

( * ) Notice: Subject to any disclaimer, the term of this patent is extended or adjusted under 35 U.S.C. 154(b) by 0 days.

(21) Appl. No.: 16/819,876

(22) Filed: Mar. 16, 2020

(65) Prior Publication Data

US 2021/0289437 A1     Sep. 16, 2021

(51) Int. Cl.
*H04W 48/20*     (2009.01)
*H04W 76/11*     (2018.01)
(Continued)

(52) U.S. Cl.
CPC .......... *H04W 48/20* (2013.01); *H04B 17/318* (2015.01); *H04W 36/0022* (2013.01); *H04W 36/00835* (2018.08); *H04W 76/11* (2018.02)

(58) Field of Classification Search
CPC . H04W 28/08; H04W 28/02; H04W 28/0284; H04W 28/0289; H04W 28/085;
(Continued)

(56) References Cited

U.S. PATENT DOCUMENTS

2008/0130593 A1* 6/2008 Scheinert ............... H04W 8/30
370/337
2010/0184429 A1* 7/2010 Tod ................... H04W 36/0061
455/434

(Continued)

OTHER PUBLICATIONS

"3rd Generation Partnership Project; Technical Specification Group Services and System Aspects; Release 15 Description; Summary of Rel-15 Work Items (Release 15)." 3GPP TR 21.915 V15.0.0 (Sep. 2019). 118 pages.

(Continued)

*Primary Examiner* — Jean A Gelin
(74) *Attorney, Agent, or Firm* — Amin, Turocy & Watson, LLP

(57) ABSTRACT

In multicarrier networks mobile devices can be distributed amongst carriers based on different criteria. However, prioritization may cause certain devices to end up on a carrier that is not optimal for the network. When there is a deployment of different types of cells (e.g., macro cells, small cells, etc.), the cells can use the same frequency. Consequently, a priority value contained within a system information broadcast message can override the mobile default cell transition procedures and thus select a neighboring cell based on additional criteria. Thus, small cells can be deployed to offload traffic from macro cells in spite of the small cells and macro cells operating in the same frequency band.

20 Claims, 10 Drawing Sheets

(51) Int. Cl.
*H04W 36/00* (2009.01)
*H04B 17/318* (2015.01)

(58) Field of Classification Search
CPC ..... H04W 28/12; H04W 28/20; H04W 36/06; H04W 36/22; H04W 36/24; H04W 48/08; H04W 48/20; H04W 72/0453; H04W 88/02; H04W 88/08; H04W 72/10
See application file for complete search history.

(56) References Cited

U.S. PATENT DOCUMENTS

| | | | | |
|---|---|---|---|---|
| 2011/0275402 | A1* | 11/2011 | Charipadi | H04W 56/0035 455/522 |
| 2013/0201968 | A1* | 8/2013 | Nakamura | H04W 72/048 370/336 |
| 2015/0131578 | A1* | 5/2015 | Baek | H04W 72/0406 370/329 |
| 2015/0131607 | A1* | 5/2015 | Koorapaty | H04L 5/0007 370/330 |
| 2015/0249952 | A1* | 9/2015 | Lee | H04L 5/0073 370/312 |
| 2016/0014626 | A1* | 1/2016 | Yi | H04J 11/0053 370/252 |
| 2016/0044539 | A1* | 2/2016 | Yiu | H04W 88/02 370/235 |
| 2016/0119816 | A1* | 4/2016 | Yasukawa | H04L 43/0876 455/453 |
| 2016/0278030 | A1* | 9/2016 | Yi | H04W 56/00 |
| 2018/0220330 | A1* | 8/2018 | Van Der Velde | H04W 28/0284 |
| 2018/0323835 | A1* | 11/2018 | Wang | H04L 5/0057 |
| 2020/0137630 | A1* | 4/2020 | Choi | H04W 28/12 |
| 2020/0205144 | A1* | 6/2020 | Zhang | H04W 72/0406 |
| 2020/0374719 | A1* | 11/2020 | Wang | H04W 24/04 |

OTHER PUBLICATIONS

"3rd Generation Partnership Project; Technical Specification Group Radio Access Network; Evolved Universal Terrestrial Radio Access (E-UTRA); Radio Resource Conlrol (RRC); Protocol specification (Release 15)." 3GPP TS 36.331 V15.8.0 (Dec. 2019). 964 pages.

* cited by examiner

FACILITATION OF IDLE MODE CELL RESELECTION FOR 5G OR OTHER NEXT GENERATION NETWORK

TECHNICAL FIELD

This disclosure relates generally to facilitating idle mode cell reselection. For example, this disclosure relates to facilitating priority idle mode cell reselection over long-term evolution (LTE)/5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating idle mode cell reselection is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
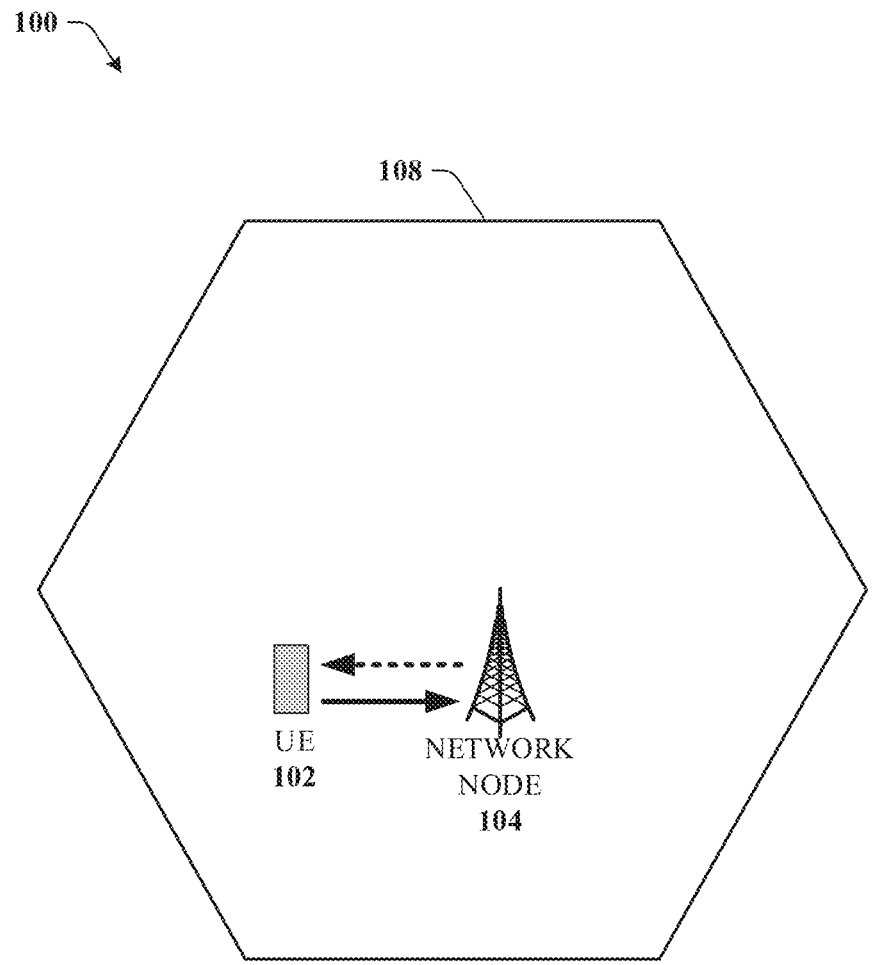
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate idle mode cell reselection for LTE, 5G air interface, or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate idle mode cell reselection for an LTE or 5G network. Facilitating idle mode cell reselection for an LTE or 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied to 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Where there are multicarrier networks, the UEs can be distributed amongst the carriers based on different criteria. Prioritization may cause certain devices to end up on a carrier that it should not be on. When there is a deployment of different types of cells (e.g., macro cells, small cells, etc.), in some scenarios, the small cell and the macro cell can use a same frequency. However, if the same carrier is being utilized there is no mechanism to prioritize the small cell over the macro cell on the same carrier.

For example, the UE 102 can have multiple choices for cell reselection. The small cells can be deployed to offload traffic from macro cells, and the small cells can operate in the same frequency band of macro cell. Therefore, the small cell and macro can have the same frequency priority.

A wireless operator can use idle mode traffic management to move UEs to small cell. Idle mode traffic management can comprise LTE inter-frequency prioritization. The macro cell can operate in the same frequency band as the small cell. The macro cell transmission power (40 W) can be stronger than small cell transmission power (5 W). Thus, the UE will tend to choose the macro cell instead on small cell. As a result, the UE may not be able to offload traffic to the small cell.

A system information broadcast (SIB) 5 message can be modified to comprise a new field: "CellPriority". Thus, the SIB5 message can contain information on the priority of a carrier and a list of neighboring cells on the carrier. When the UE receives this information, the information can be used to reselect a carrier based on the list. If the minimum signal level criteria is fulfilled, the UE can reselect to another frequency associated with a higher priority carrier. A UE can read the SIB5 message when camping on a serving cell. The UE can perform inter-frequency cell measurement and idle mode inter-frequency cell reselection. If conditions are met for the UE to move to a high-priority frequency band, and if more than one cell is operating in that frequency band, then the UE can use the frequency priority, neighboring cell info, cell priority, and/or reference signal received power (RSRP) to choose a candidate cell for idle mode cell reselection. Modification of the SIB5 can prompt modifications to the RAN (e.g., eNB, radio access network intelligent controller (RIC)) and the UE. The UE can read the new SIB5 field ("CellPriority") and interpret the new value to select the candidate cell for idle mode cell reselection.

The proposed solution can improve traffic offload from congested cells to uncongested cells with large un-used resources. This solution can be used to offload traffic from macro cells to small cells. Small cells can be cell-on-wheels, flying-eNBs, etc. This solution can be applied to LTE and LTE/5G dual connectivity (DC), and 5G networks.

Handovers can control the UE mobility in connected mode, whereby the network can decide which cell to handover to. Cell reselection can control the UE mobility while the UE is in idle mode. During cell reselection, the UE can decide which cell to camp on. During idle mode, the UE can reselect a cell that uses the same LTE frequency as its current serving cell that it is camping on (e.g., intra-frequency), that does not use the same frequency (e.g., inter-frequency), or that uses another radio access technology (e.g., inter-RAT). During the initial network entry and idle mode cell reselection, the UE can measure the reference signal received power (RSRP) from neighboring cells. Then, the UE can select a cell to camp on based on the RSRP. In general, the UE can select the cell with the strongest RSRP. In addition, frequency priority and IRAT priority can also be configured by the UE when selecting a cell to camp on.

The UE can obtain information needed for cell reselection (e.g., threshold values used to decide whether to measure the signal strength of neighbor cells or not, parameters used for calculating rank of the serving cell, and/or neighbor cells, etc.) from the system information broadcasted (SIB) by the eNB. After cell selection, the UE can perform measurements and carry out cell reselection of new candidate cells, which can be based on certain criterion. The reselection process can comprise two steps. The first step can comprise a measurements condition that can specify when to start measuring neighboring cells. Once the measurements condition is satisfied, the UE can measure the RSRP level of the E-UTRA cells on the current frequency, any inter-frequency, and/or inter-RAT frequency carriers. The second step involves a reselection condition that can specify reselection criteria for candidate cells. There can be two different mechanisms for cell reselection. The first can be legacy based, which comprises a classical ranking based system and can be applied to intra-frequency reselection. It can also be applied to inter frequencies which are equally prioritized. The UE can apply cell ranking criterion on the serving cell and the neighboring cell. The second can be priority based comprising priority values in a range (e.g., 0 to 7), where 0 can indicate the lowest priority and 7 can indicate the highest priority. Priorities can be set for inter frequencies (e.g., lower, equal or higher priority), and/or inter-RAT frequencies (e.g., higher or lower priority).

During serving cell measurements, a UE in an idle state can wake up at the end of every discontinuous reception (DRX) cycle to measure the signal of its serving cell (QSrxlevmeas) and calculate the received signal level (Srxlev) of the serving cell to decide whether it should stay or move to another cell. During cell reselection triggering, if the received signal level of the serving cell (Srxlev) is greater than the specified threshold value (s-IntraSearch), the UE can remain on the current serving cell. If not, the UE can trigger a cell reselection procedure. The threshold value that works as the triggering criterion can delivered through a SIB 3 message.

If the serving cell's evaluation meets Equation 1 and Equation 2 criteria, the UE may not perform a non-intra-frequency measurement. However, if the serving cell's evaluation result does not meet Equation 1 and Equation 2 criteria, the UE can perform Non intra frequency measurement.

$$SrxLev > \text{s-NonIntraSearch}P \qquad \text{Equation 1}$$

$$Squal > \text{s-NonIntraSearch}Q \qquad \text{Equation 2}$$

If neither of s-NonIntraSearchP nor s-NonIntraSearchQ is specified, the UE can apply the default value (s-NonIntraSearchP=Infinity, s-NonIntraSearchQ=0). It implies that if neither of s-NonIntraSearchP and s-NonIntraSearchQ are specified, the UE can perform Non-Intra frequency measurements.

During LTE to inter-frequency/inter-RAT cell reselection, if threshServingLowQ is broadcast in system information and more than 1 second has elapsed since the UE has camped on the current serving cell, cell reselection to a cell on a higher priority frequency or inter-RAT frequency than the serving frequency can be performed if: a cell of a higher priority RAT/frequency fulfills $Srxlev > Thresh_{(x, HighP)}$ at time interval Treselection RAT; and more than 1 second has elapsed since the UE camped on the current serving cell. Cell reselection to a cell on an equal priority frequency can be based on ranking for intra-frequency cell reselection based on RSRP levels. If threshServingLowQ is broadcast in system information and more than 1 second has elapsed since the UE has camped on the current serving cell, cell reselection to a cell on a lower priority frequency or inter-RAT frequency than the serving frequency can be performed if: the serving cell fulfills $Srxlev > Thresh_{(Serving, LowP)}$ and a cell of a lower priority RAT/frequency fulfills $Srxlev > Thresh_{(x, LowP)}$ during a time interval Treselection-RAT; and more than 1 second has elapsed since the UE camped on the current serving cell.

Cell reselection to a higher priority RAT/frequency can take precedence over a lower priority RAT/frequency if multiple cells of different priorities fulfil the cell reselection criteria. For the SIB5 message, an inter frequency carrier frequency list can comprise multiple frequency bands (e.g., dl_CarrierFreq) of neighboring cells. Each dl_CarrierFreq can be identified by the frequency band in Mhz. Each dl_CarrierFreq can be mapped to a corresponding cell reselection priority, where 0 can indicate lowest priority and 7 can indicate the highest priority. Each dl_CarrierFreq can contain a list of neighboring cells operating in the corresponding frequency band. The SIB5 message can be unique for each eNB, and the RIC can be used to update the SIB5 message based on the network configuration.

The proposed solution can use multiple techniques to rank cells that belong to the same freq. band. For example, in one embodiment, the macro cell can be mapped with a CellPriority=1, while small cells can receive CellPriority>1. Small cells with high bandwidth (e.g., carrier aggregation) can receive larger CellPriority values. The UE can rank cells first based on frequency priority, and then rank cells again within each frequency priority levels based on cell priority if the cells have a RSRP above a specified threshold. In another embodiment, the cell priority can be set as described above, and neighboring cells can be ranked based on a linear combination of frequency priority, cell priority, and/or RSRP. For example, $$RANKCell_x = W_1 * \text{Freq-Priority}_x + W_2 * \text{CellPriority}_x + W_3 * RSRP_x, \qquad \text{Equation 3}$$

where $W_1$, $W_2$, $W_3$ are weighting factors set by the operator.

Cell priority can also be updated on demand based on loading conditions. For example, if a given small cell is overloaded, then it can receive a lower cell priority value to avoid the UEs offloading to this cell. The eNB can update the SIB5 message, broadcast a new SIB message to the UEs camped to it, and/or force these UEs to read the SIB message. The UE prioritization can also be considered (e.g., prioritization based on SPID) when offloading UEs to other cells. In other words, the UEs can rank neighboring cells based on a linear combination of frequency priority, cell priority, RSRP, and/or SIPD. This can be used for LTE and/or 5G technologies. 5G technologies can comprise frequency priority, neighboring cell information, and/or the proposed cell priority field in a SIB4 message, instead of SIB5 (LTE).

In one embodiment, described herein is a method comprising receiving, by a mobile device comprising a processor, first frequency data representative of a first frequency associated with a macro cell communication device. The method can comprise receiving, by the mobile device, second frequency data representative of a second frequency associated with a small cell communication device. Additionally, the method can comprise receiving, by the mobile device, priority data representative of a priority associated with a communication with the small cell communication device. Furthermore, in response to the receiving the priority data, the method can comprise selecting, by the mobile device, a cell communication device for the communication with the mobile device, resulting in a selected cell communication device.

According to another embodiment, a system can facilitate receiving first frequency data representative of a first frequency associated with a macro cell communication device. The system can comprise receiving second frequency data representative of a second frequency associated with a small cell communication device. In response to a condition being determined to have been satisfied, the system can comprise facilitating selecting a cell communication device from a group of cell communication devices for a communication with a mobile device, resulting in a selected cell communication device, wherein the group of cell communication devices comprise the macro cell communication device and the small cell communication device.

According to yet another embodiment, described herein is a machine-readable medium that can perform the operations comprising receiving first frequency data representative of a first frequency associated with a macro cell communication device. The machine-readable medium can perform the operations comprising receiving second frequency data representative of a second frequency associated with a first small cell communication device. Additionally, the machine-readable medium can perform the operations comprising receiving third frequency data representative of a third frequency associated with a second small cell communication device. Furthermore, in response to a condition being determined to have been satisfied, the machine-readable medium can perform the operations comprising facilitating selecting a cell communication device for a communication with a mobile device, wherein the selecting selected one of the macro cell communication device, the first small cell communication device, and the second small cell communication device, resulting in a selected cell communication device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
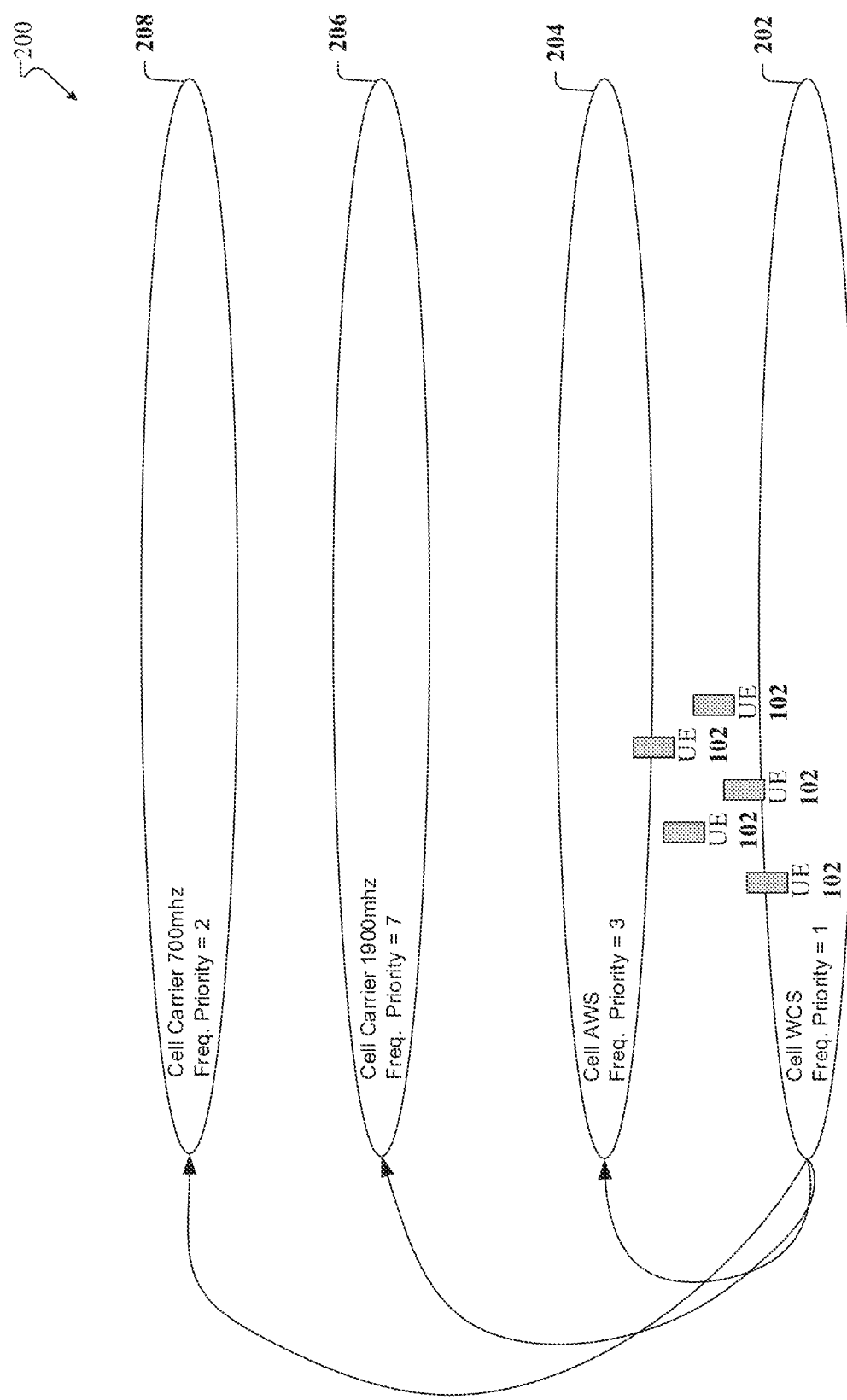
FIG. 2 illustrates an example schematic system block diagram of a priority offloading scenarios according to one or more embodiments.
Figure 3:
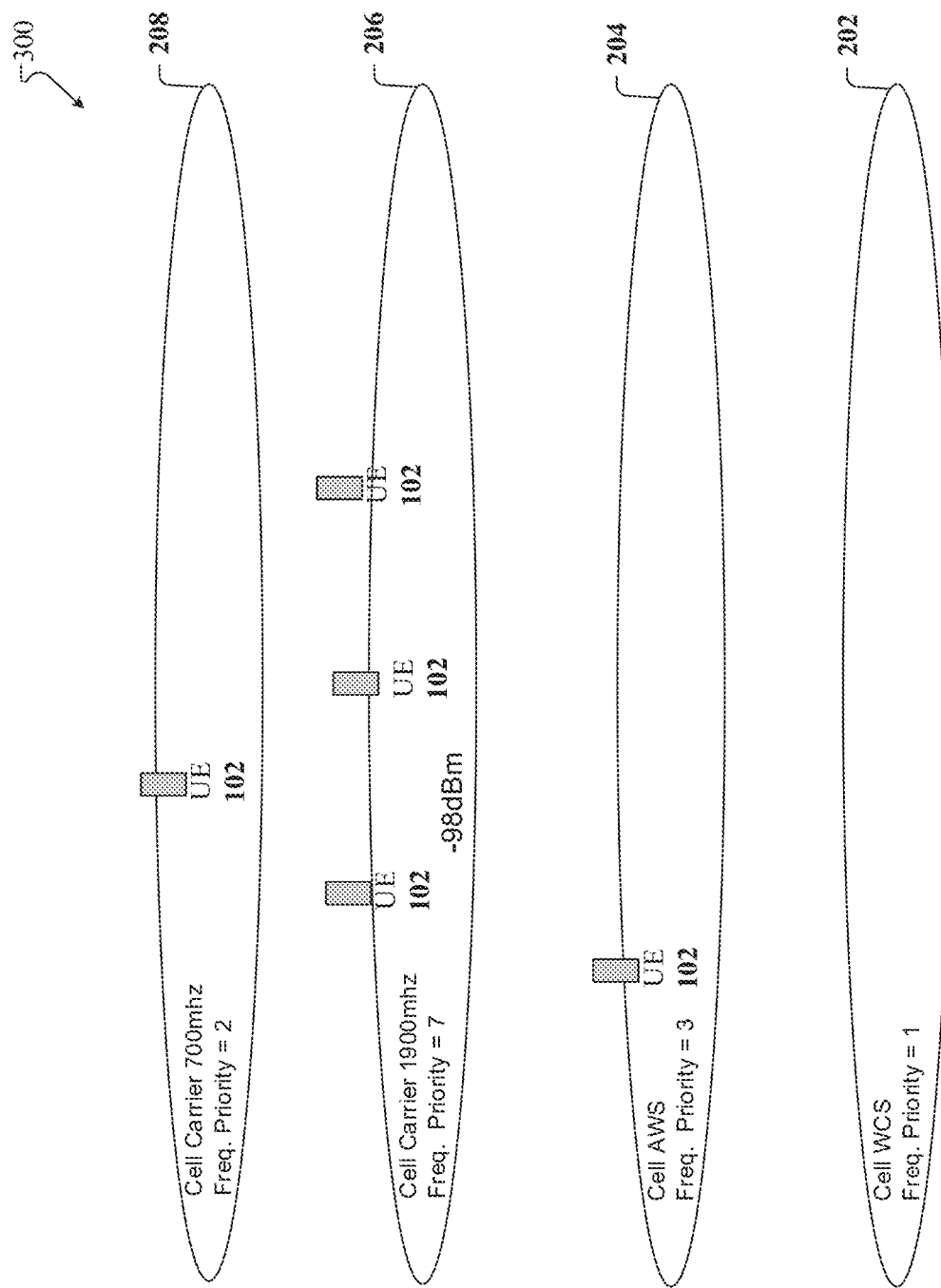
FIG. 3 illustrates an example schematic system block diagram of a priority offloading scenarios according to one or more embodiments.
Figure 4:
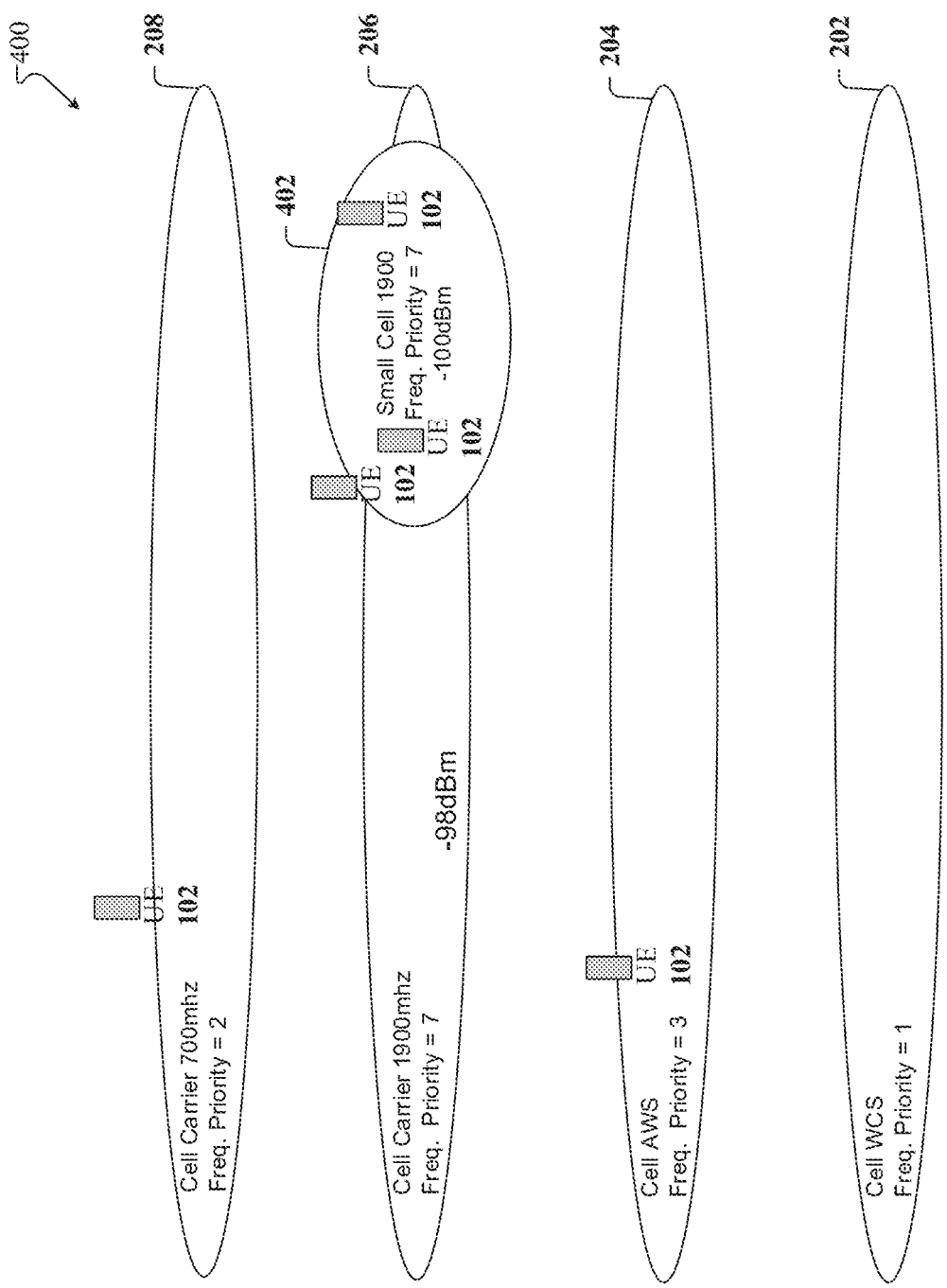
FIG. 4 illustrates an example schematic system block diagram of a priority offloading scenarios according to one or more embodiments.

Referring now to FIG. 2-FIG. 5, illustrated are example schematic system block diagram of priority offloading scenarios. As depicted in FIG. 2, if the UE is on priority 1 on the WCS macrocell 202 and measures the other cells (e.g., macrocells 204, 206, 208), then based on the prioritization in scenario 200, the UEs 102 can offload to the other macrocells 204, 206, 208. Since the 1900 Mhz macrocell 206 as the highest priority cell (e.g., freq. priority=7), more UEs 102 can be offloaded there in scenario 300 as depicted in FIG. 3. However, as depicted in FIG. 4, in some scenarios 400, the 1900 Mhz macrocell 206 can comprise a 1900 Mhz small cell 402 at the same priority. In this scenario 400, the UE 102 would not know whether to select the macrocell 206 or the small cell 402 because they are on the same frequency and the same priority. However, the signal level (e.g., −98 dBm) on the macrocell 206 is better than the signal level (e.g., −100 dBm) on the small cell 402. Therefore, by default, the UE 102 can select the macrocell 206 for communications. However, selection of the small cell 302 may be better overall if there is more capacity at the small cell 302. Thus, additional information can be included in the SIB5 message such that if there is a same frequency on different cells, then an additional priority parameter can prioritize the neighbor cells on the same frequency (e.g., setting the priority of the small cell 402 higher than the priority of the macro cell on the same frequency) such that the UE 102 does not automatically default to the cell with the better signal.

Figure 5:
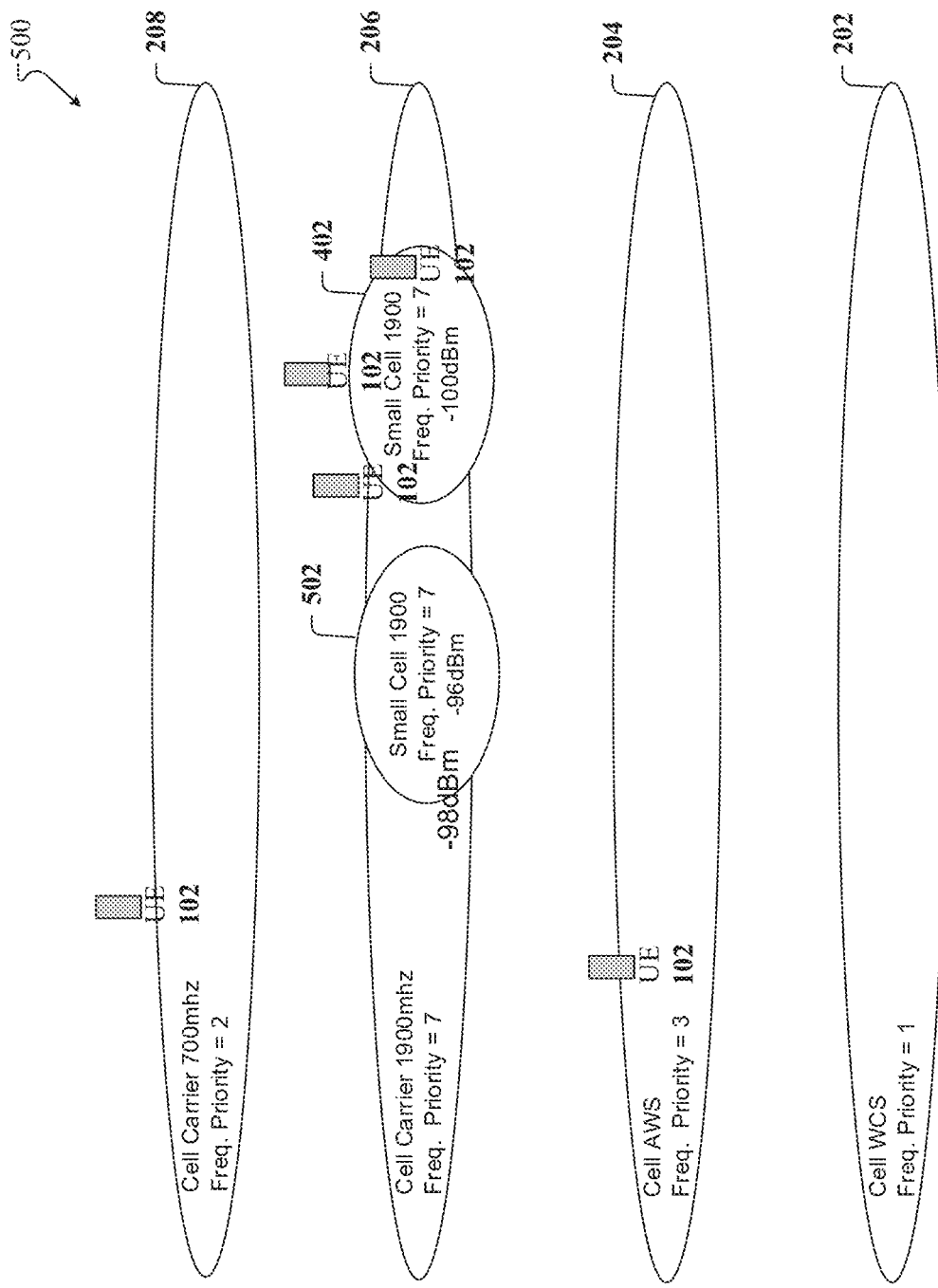
FIG. 5 illustrates an example schematic system block diagram of a priority offloading scenarios according to one or more embodiments.

In FIG. 5, the additional field of the SIB5 message can indicate the priority of a neighboring cells on the same frequency. However, if the frequency, and the priority values are the same as depicted in scenario 500 with multiple small cells 402, 502, then the UE 102 can default to the cell with the better signal level (e.g., dBm). Thus, without receiving the SIB5 message priority value, the UE 102 can select the small cell 502 based on defaulting to the better signal (e.g., −96 dBm). However, if the UE 102 receives the SIB5 message priority value indicating that the small cell 402 is the top priority, then the UE 102 can select the small cell 402 for communication.

Figure 6:
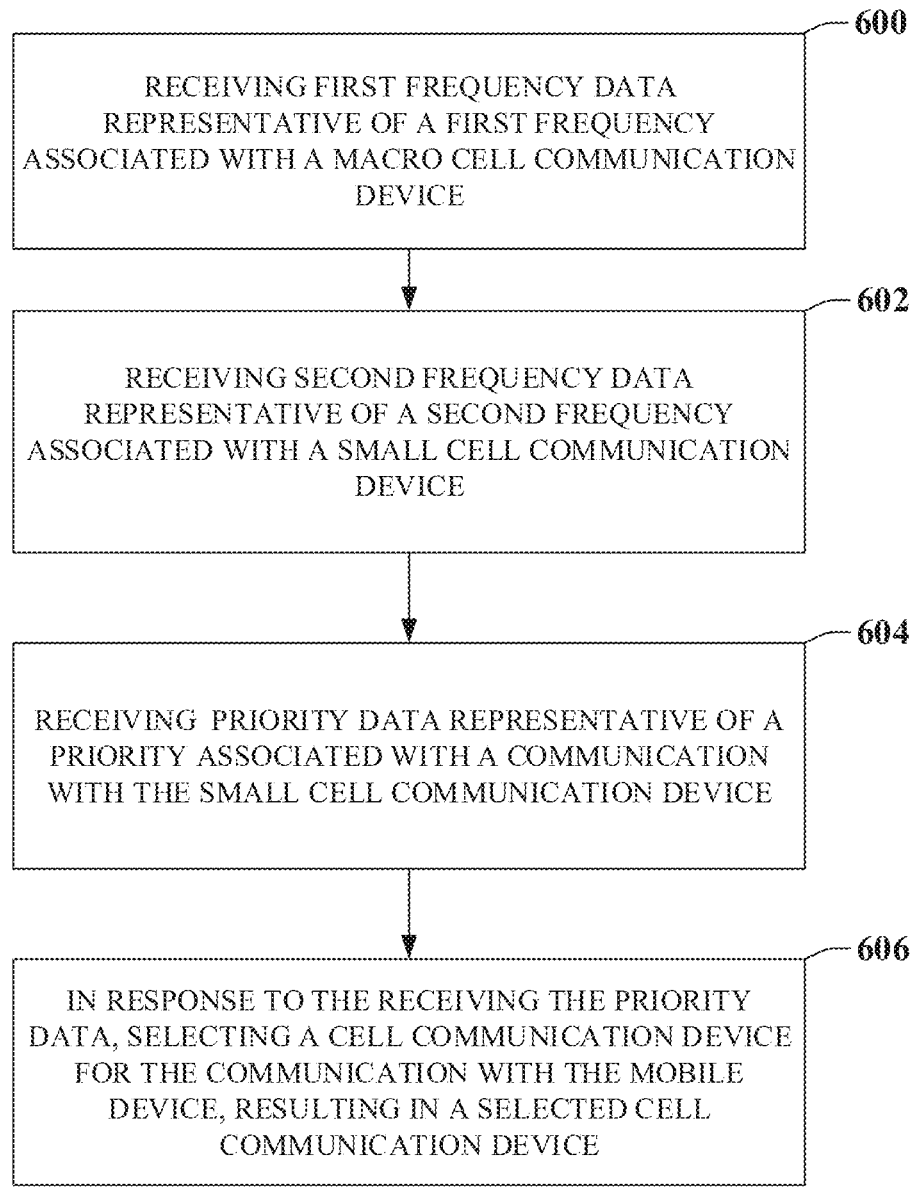
FIG. 6 illustrates an example flow diagram for a method for priority offloading for a 5G network according to one or more embodiments.

Referring now to FIG. 6, illustrated is an example flow diagram for a method for priority offloading for a 5G network according to one or more embodiments. A element 600, the method can comprise receiving first frequency data representative of a first frequency associated with a macro cell communication device. At element 602, the method can comprise receiving second frequency data representative of a second frequency associated with a small cell communication device. Additionally, at element 604, the method can comprise receiving, priority data representative of a priority associated with a communication with the small cell communication device. Furthermore, at element 606, in response to the receiving the priority data, the method can comprise selecting a cell communication device for the communication with the mobile device, resulting in a selected cell communication device.

Figure 7:
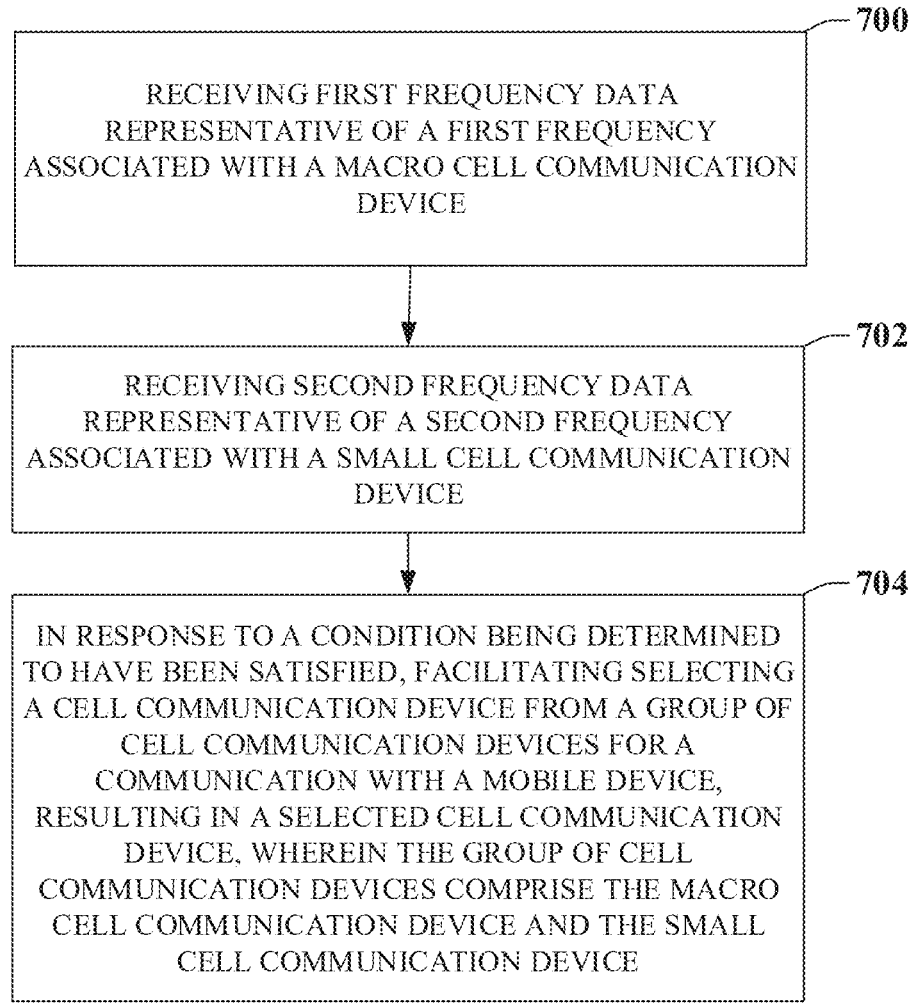
FIG. 7 illustrates an example flow diagram for a system for priority offloading for a 5G network according to one or more embodiments.

Referring now to FIG. 7, illustrated is an example flow diagram for a system for priority offloading for a 5G network according to one or more embodiments. At element 700, the system can facilitate receiving first frequency data representative of a first frequency associated with a macro cell communication device. At element 702, the system can comprise receiving second frequency data representative of a second frequency associated with a small cell communication device. In response to a condition being determined to have been satisfied, at element 704, the system can comprise facilitating selecting a cell communication device from a group of cell communication devices for a communication with a mobile device, resulting in a selected cell communication device, wherein the group of cell communication devices comprise the macro cell communication device and the small cell communication device.

Figure 8:
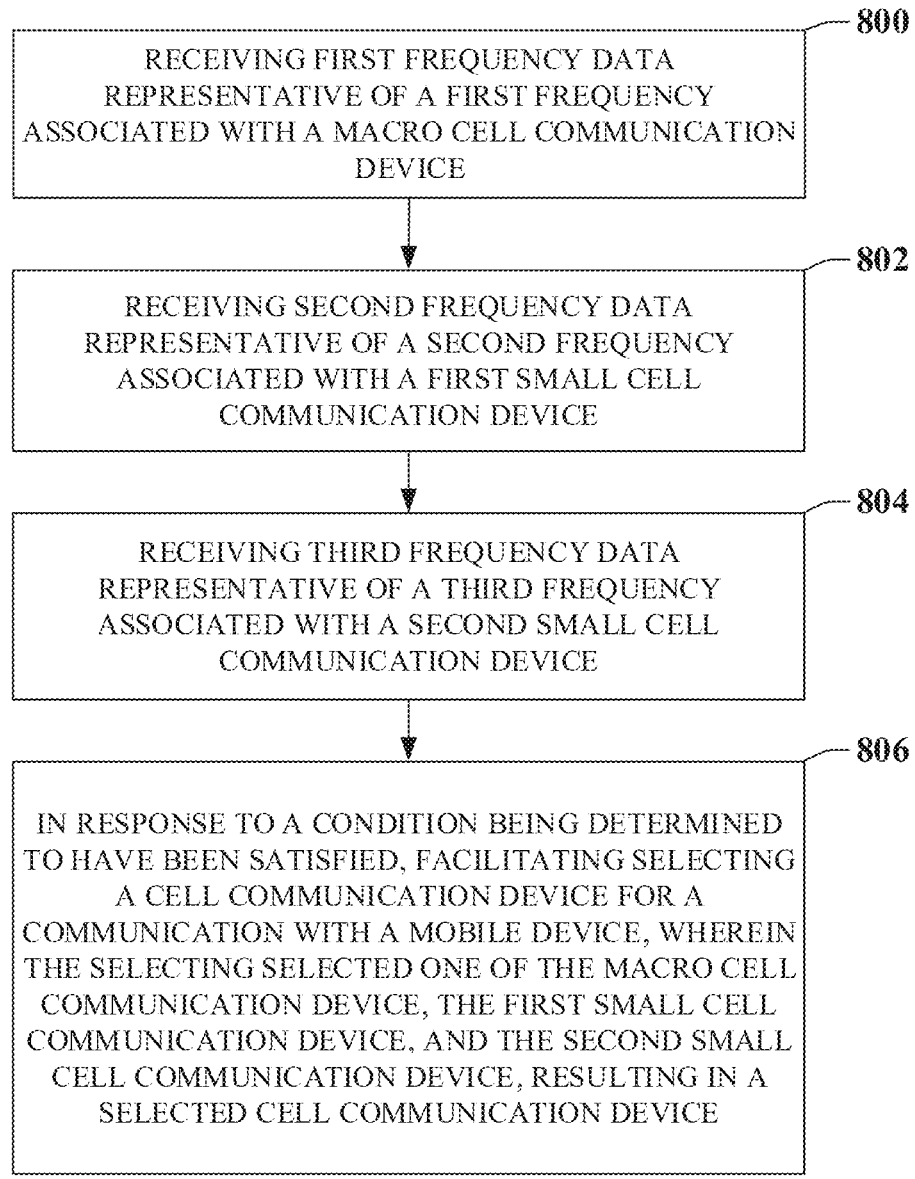
FIG. 8 illustrates an example flow diagram for a machine-readable medium for a 5G network according to one or more embodiments.

Referring now to FIG. 8, illustrated an example flow diagram for a machine-readable medium for priority offloading for a 5G network according to one or more embodiments. At element 800, the machine-readable medium can perform the operations comprising receiving first frequency data representative of a first frequency associated with a macro cell communication device. At element 802, the machine-readable medium can perform the operations comprising receiving second frequency data representative of a second frequency associated with a first small cell communication device. Additionally, at element 804, the machine-readable medium can perform the operations comprising receiving third frequency data representative of a third frequency associated with a second small cell communication device. Furthermore, in response to a condition being determined to have been satisfied, at element 806, the machine-readable medium can perform the operations comprising facilitating selecting a cell communication device for a communication with a mobile device, wherein the selecting selected one of the macro cell communication device, the first small cell communication device, and the second small cell communication device, resulting in a selected cell communication device.

Figure 9:
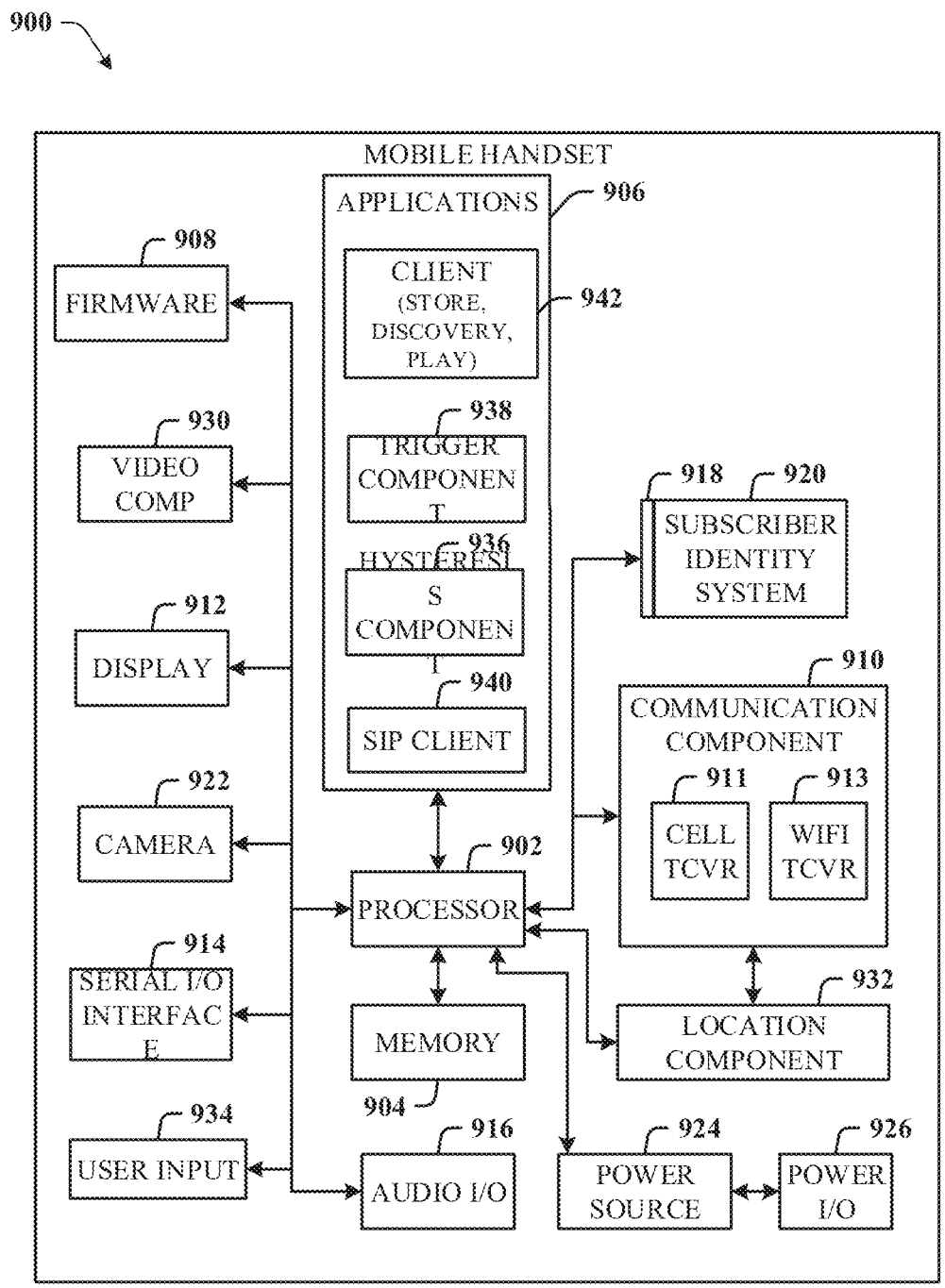
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
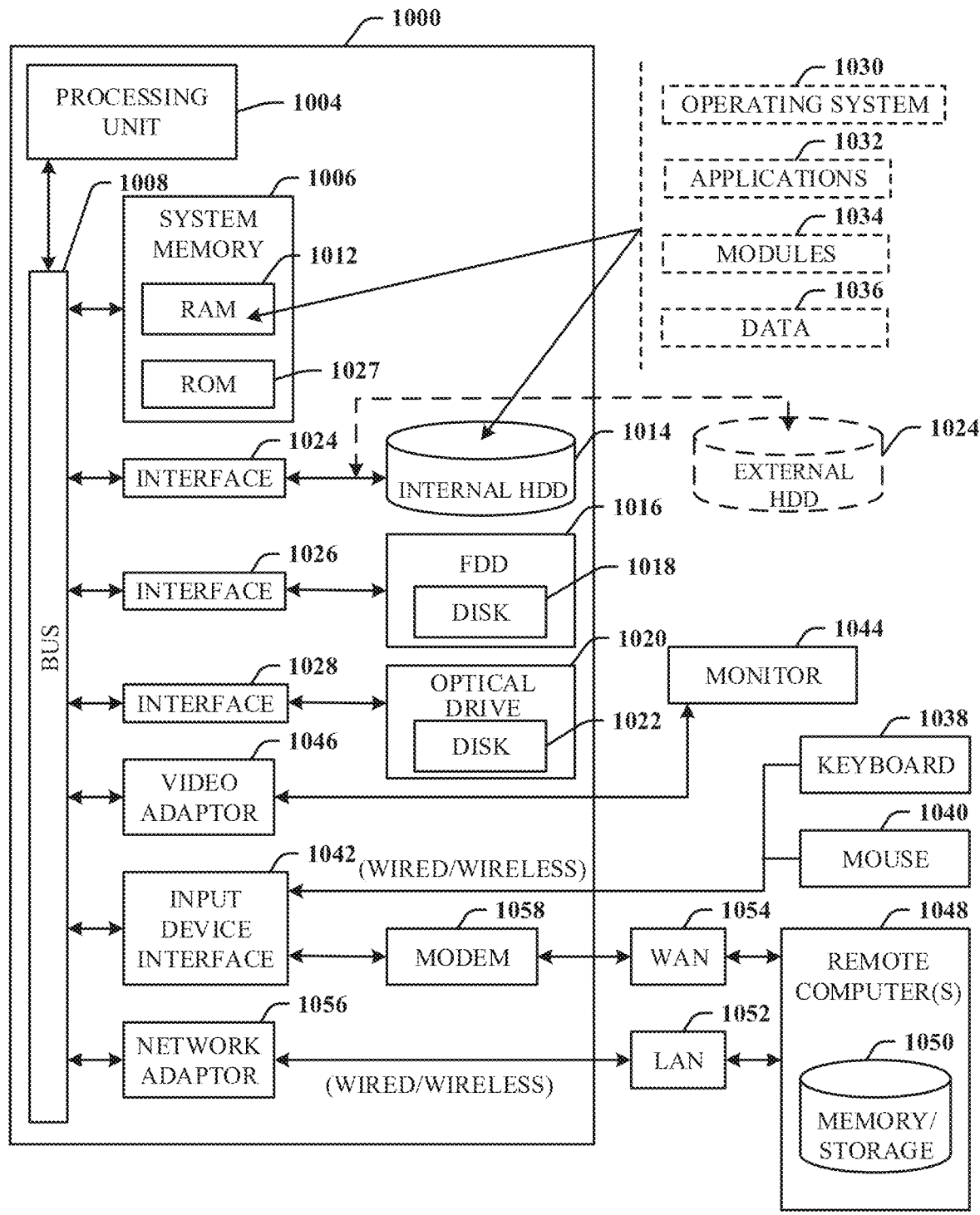
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a mobile device comprising a processor, first frequency data representative of a first frequency associated with a macro cell communication device;
   receiving, by the mobile device, second frequency data representative of a second frequency associated with a small cell communication device;
   receiving, by the mobile device, priority data representative of a first priority value associated with a communication with the small cell communication device, wherein the first priority value is greater than a second priority value associated with the macro cell communication device;
   receiving, by the mobile device, signal level data representative of a signal level associated with the communication with the small cell communication device; and
   in response to receiving the priority data and in response to the signal level data being determined to satisfy a function with respect to a signal threshold, selecting, by the mobile device, a microcell communication device or the small cell communication device for the communication with the mobile device, resulting in a selected cell communication device.

2. The method of claim 1, wherein the first frequency and the second frequency are a same frequency.

3. The method of claim 2, wherein a system information broadcast message comprises the priority data.

4. The method of claim 2, wherein a system information broadcast message comprises identification data representative of the macro cell communication device.

5. The method of claim 2, wherein a system information broadcast message comprises identification data representative of the small cell communication device.

6. The method of claim 1, wherein the selecting comprises selecting the small cell communication device.

7. The method of claim 1, wherein the selecting comprises selecting the microcell communication device.

8. A system, comprising:
a processor; and
a memory that stores executable instructions that, when executed by the processor, facilitate performance of operations, comprising:
receiving first frequency data representative of a first frequency associated with a macro cell communication device;
receiving second frequency data representative of a second frequency associated with a small cell communication device;
receiving priority data representative of a first priority value associated with a communication with the small cell communication device, wherein the first priority value is greater than a second priority value associated with the macro cell communication device;
receiving signal strength data representative of a signal strength associated with the communication with the small cell communication device; and
in response to the signal strength data being determined not to have satisfied a signal threshold, selecting a cell communication device from a group of cell communication devices for the communication with a mobile device, resulting in a selected cell communication device, wherein the group of cell communication devices comprise the macro cell communication device and the small cell communication device.

9. The system of claim 8, wherein the signal strength is associated with a priority value assigned to the macro cell communication device.

10. The system of claim 8, wherein the selected cell communication device is the small cell communication device.

11. The system of claim 10, wherein selecting the cell communication device is further based on a signal strength observed by the mobile device.

12. The system of claim 8, wherein the selected cell communication device is the macro cell communication device.

13. The system of claim 12, wherein a first signal strength associated with the macro cell communication device is greater than a second signal strength associated with the small cell communication device.

14. The system of claim 13, wherein a first load capacity of the macro cell communication device is less than a second load capacity of the small cell communication device.

15. A non-transitory machine-readable medium, comprising executable instructions that, when executed by a processor, facilitate performance of operations, comprising:
receiving first frequency data representative of a first frequency associated with a macro cell communication device;
receiving second frequency data representative of a second frequency associated with a first small cell communication device;
receiving third frequency data representative of a third frequency associated with a second small cell communication device;
receiving priority data representative of a first priority value associated with a first communication with the first small cell communication device, wherein the first priority value is greater than a second priority value associated with the second small cell communication device and greater than a third priority value associated with the macro cell communication device;
receiving first signal level data representative of a first signal level associated with a second communication with the second small cell communication device, wherein the first signal level is greater than a second signal level associated with the first small cell communication device; and
in response to a signal level threshold condition being determined to have been satisfied, selecting the first small cell communication device for a third communication with a mobile device, wherein selecting the first small cell communication device results in a selected small cell communication device.

16. The non-transitory machine-readable medium of claim 15, wherein the signal level threshold condition is associated with a priority value of the selected cell communication device as opposed to unselected cell communication devices.

17. The non-transitory machine-readable medium of claim 16, wherein the second frequency and the third frequency are a same frequency.

18. The non-transitory machine-readable medium of claim 15, wherein a system information broadcast message comprises identification data representative of the second small cell communication device.

19. The non-transitory machine-readable medium of claim 17, wherein the second frequency and the third frequency are a different frequency.

20. The non-transitory machine-readable medium of claim 15, wherein the first small cell communication device and the second small cell communication device are neighboring communication devices.

* * * * *